March 1, 1966 K. C. ALLEN ETAL 3,238,001
RACKS
Filed May 2, 1963 3 Sheets-Sheet 1
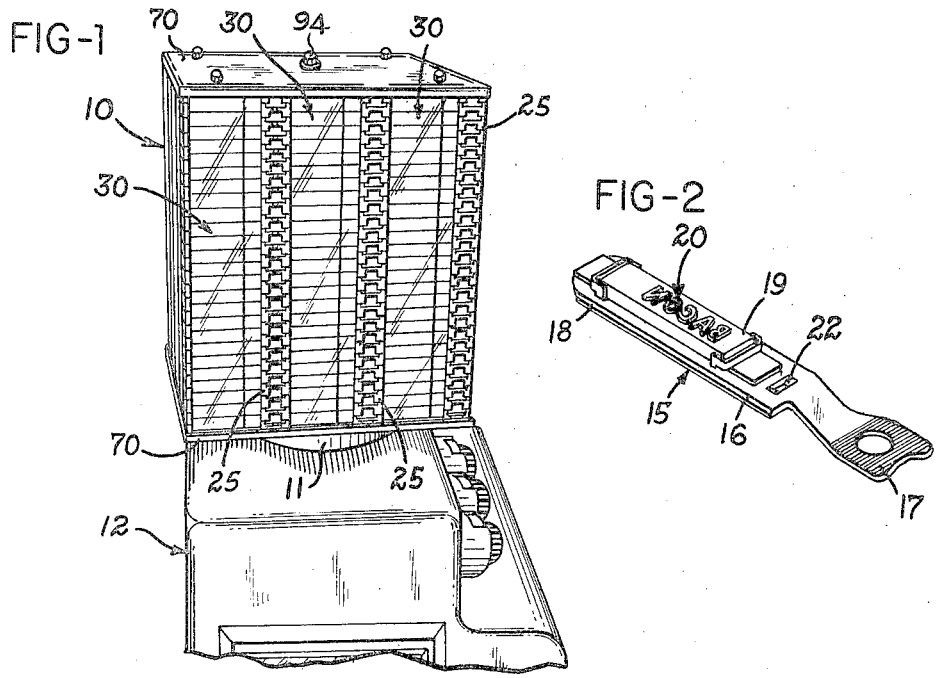
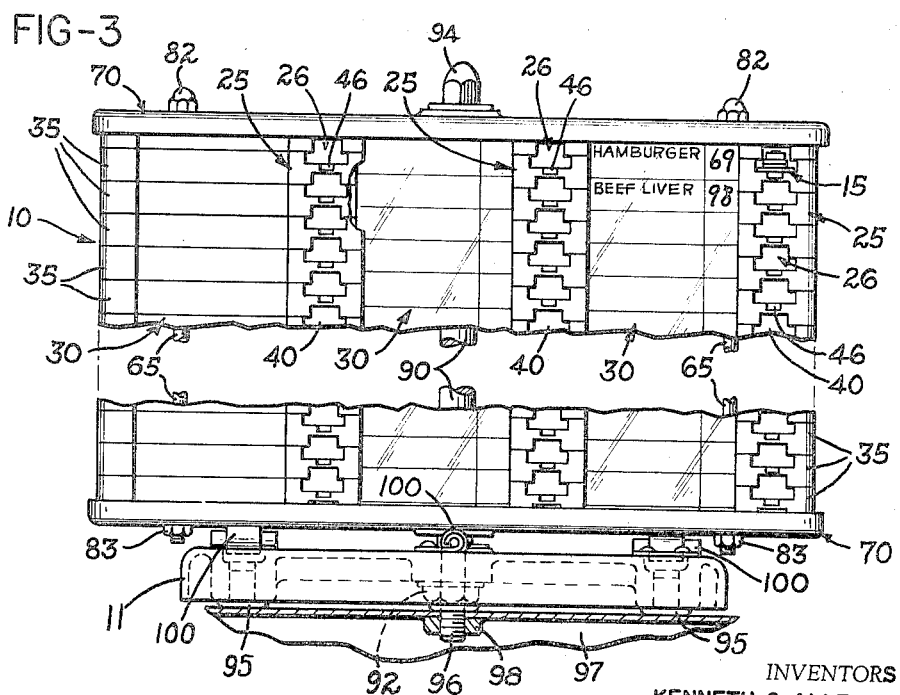
INVENTORS
KENNETH C. ALLEN,
BELFORD M. ELLINGSON, JR.
& DAVID A. MEEKER
BY
Marechal, Biebel, French & Bugg
ATTORNEYS March 1, 1966   K. C. ALLEN ETAL   3,238,001
RACKS
Filed May 2, 1963   3 Sheets-Sheet 2
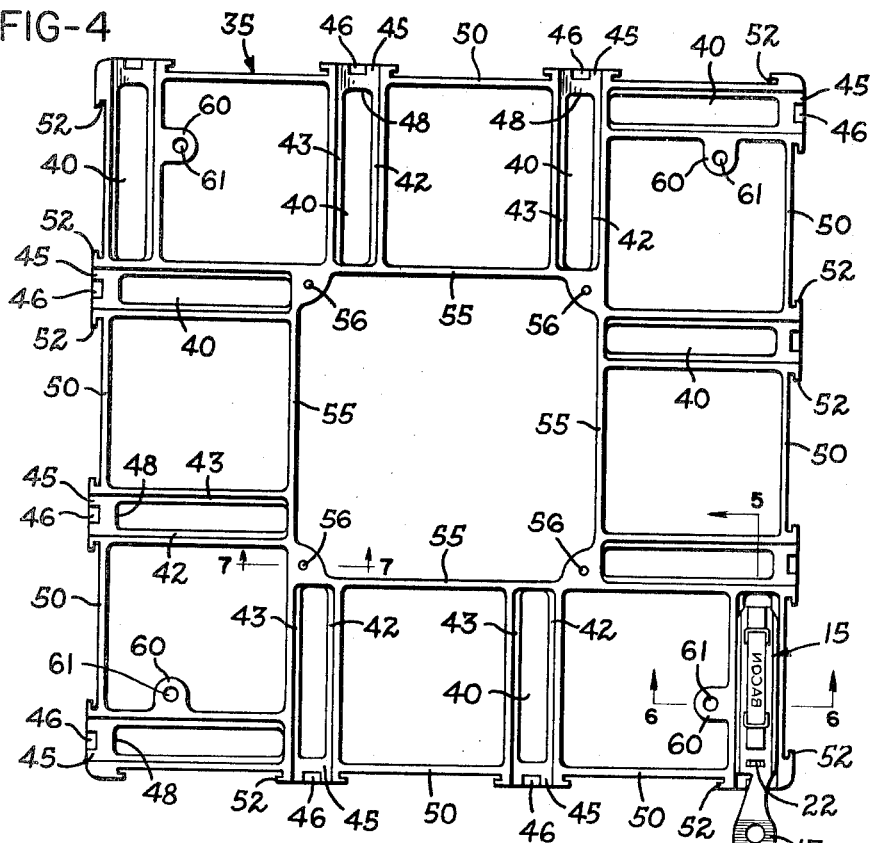
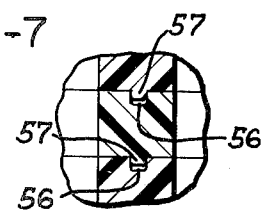
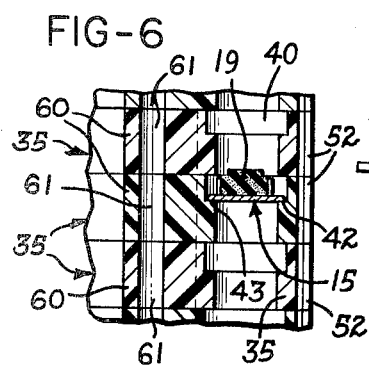
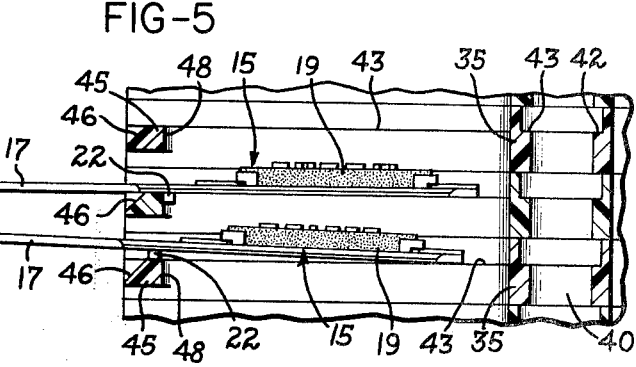
INVENTORS
KENNETH C. ALLEN,
BELFORD M. ELLINGSON, JR.
BY  & DAVID A. MEEKER
*Marschal, Biebel, French & Bugg*
ATTORNEYS March 1, 1966 K. C. ALLEN ETAL 3,238,001
RACKS
Filed May 2, 1963 3 Sheets-Sheet 3
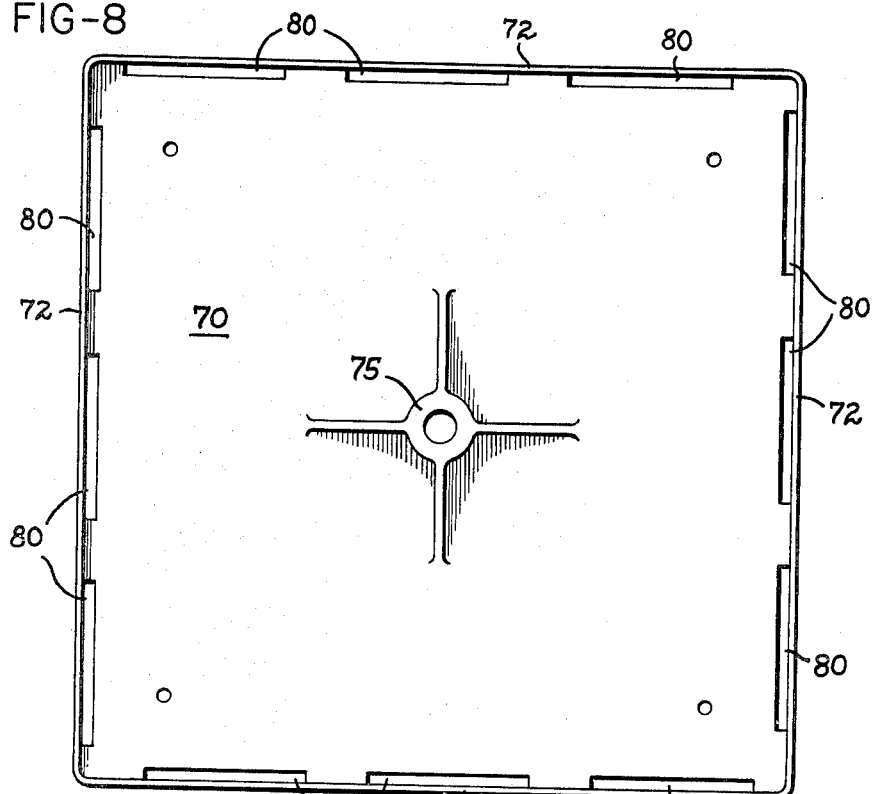
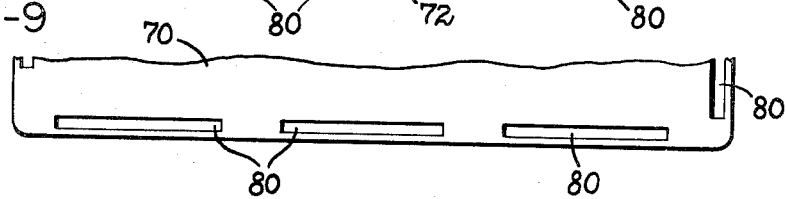
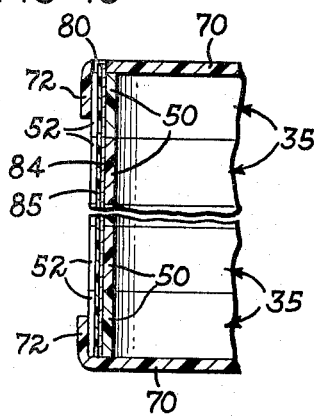
INVENTORS
KENNETH C. ALLEN,
BY BELFORD M. ELLINGSON, JR.
& DAVID A. MEEKER
*Marechal, Biebel, French & Bugg*
ATTORNEYS to a rack for receiving and storing a plurality of separate objects while providing space for the individual identification of each of the objects stored or retained therein.
United States Patent Office 3,238,001
Patented Mar. 1, 1966

3,238,001
RACKS
Kenneth C. Allen, Dayton, and Belford M. Ellingson, Jr. and David A. Meeker, Troy, Ohio, assignors to The Hobart Manufacturing Company, Troy, Ohio, a corporation of Ohio
Filed May 2, 1963, Ser. No. 277,520
3 Claims. (Cl. 312—107)

This invention relates to racks and more particularly to a rack for receiving and storing a plurality of separate objects while providing space for the individual identification of each of the objects stored or retained therein.

The invention has as one of its objects the provision of an inexpensive rack for storing a relatively large number of substantially identical items for identification and for ready access of individual items as they are needed. A particular example of such items to which this invention may be applied consists of the commodity keys used in an automatic computing and weighing scale system.

In such weighing scale systems there are commonly provided keys which are removably inserted within the printing mechanism for causing an identification of the commodity being weighed and priced to be printed on each issued ticket. For this purpose, a large number of commodity keys are frequently required. It is not uncommon for a grocery store using such an automatic scale system to require approximately three hundred such keys. It therefore becomes important to the expedient and efficient operation of the weighing scale system for the operator to be able to change the commodity keys by selecting the appropriate key and replacing the one taken out of use with a minimum of time lost.

Accordingly, an important object of this invention is to provide a compact rack or container for receiving and storing a plurality of commodity keys or the like while providing billboard sections or panels upon which identification information can be placed for each stored item.

A further object of this invention is the provision of a rack including a plurality of identical stacked segments which may be formed from a single mold, and identical top and bottom cover plates which may be formed from another mold, so that the major portion of the rack consists of parts which may be made in only two molds.

A still further object of this invention is the provision of a multi-sided rack which includes a plurality of rack sections which are stacked one above the other in contiguous relation defining at the parting planes thereof rows of article receiving openings with the thickness of the individual sections being in excess of the vertical extent of a single such opening.

Another object of this invention is the provision of a rack formed of a plurality of partitally hollow rack segments which define vertical panels adjacent vertical rows of article receiving recesses or openings providing for the identification of the articles received within the openings on the panels.

These and other objects and advantages of the invention will be apparent from the following description, the accompanying drawings and the appended claims.

In the drawings—

FIG. 1 is a perspective view of a rack constructed according to this invention;

FIG. 2 is a perspective view of a typical article which may be carried or stored within the rack of FIG. 1;

FIG. 3 is an elevational view, partially broken away, looking at one of the sides of the rack of FIG. 1;

FIG. 4 is a plan view of the rack segments;

FIG. 5 is an enlarged vertical section through a row of article openings along the line 5—5 of FIG. 4, showing one commodity key partially inserted on a lower shelf and another commodity key in its inserted or resting position;

FIG. 6 is a transverse vertical fragmentary section taken generally along the line 6—6 of FIG. 4;

FIG. 7 is an enlarged fragmentary section showing the alignment means for stacking the segments, taken generally along the line 7—7 of FIG. 4;

FIG. 8 is an inside plan view of one of the covers;

FIG. 9 is an outside fragmentary plan view of the cover of FIG. 8 showing the offset arrangement of the billboard slots; and FIG. 10 is a fragmentary vertical section showing the top and bottom covers in place on the stacked segments with a billboard and cellulose cover sheet in place in the panel sections.

The preferred embodiment of this invention is described in terms of a rack for storing for ready access and for identifying commodity keys used in a weighing scale system, but it is obvious that the teachings thereof may be applied to racks generally, such as racks for merchandising items of hardware, storing mailing plates and the like.

Referring to the figures of the drawings which illustrate a preferred embodiment of the invention, a commodity key rack 10 constructed according to the teachings of this invention is shown in FIGS. 1 and 3 as having a base 11 mounted on a top or upper surface of a printer 12 of an automatic weighing and computing scale system.

A typical commodity key 15 is shown in FIG. 2 as including a metal back or support plate 16 having an operator's handle portion 17 and a key portion 18 for insertion with the printing mechanism. The key portion 18 supports a rubber stamp 19 including identification of the commodity indicated generally as 20. The key further includes an indentation, such as a stamped recess or pin shown at 22 which determines the inserted position of the key within the printing mechanism.

As shown in FIGS. 1 and 3, the rack of this invention provides a plurality of generally vertically arranged rows 25 of article or key receiving openings 26. A vertically extending billboard panel 30 is positioned immediately to the left of each of the rows 25. The panel 30 may be suitably provided with identifying information opposite each particular article opening 26. In the embodiment described, space is provided for the commodity identification such as sirloin steak, lamb chops, chicken or the like. Additionally, space is provided for the price per pound of each such commodity. The scale interlocks normally require that the price be checked whenever the commodity key is changed, and the panels 30 provide a convenient place for price information adjacent the associated key.

The rack 10 is generally rectangular when viewed in plan with four accessible outer faces or sides each containing the panels 30 and adjacent rows 25 of article openings, although it is within the scope of this invention to form the rack with either a fewer or a greater number of usable sides.

The major portion of the rack 10 is made up of a plurality of superimposed blocks or rack segments 35, one of which is shown in plan in FIG. 4. The rack segments 35 are preferably molded of plastic material of a thickness greater than the vertical extent of one of the openings 26 and preferably are each identical to the other. As shown in FIG. 4, the rack segments 35 are partially hollow in order to conserve plastic and to reduce the total weight of the rack 10.

The individual rack segments 35 are provided with upper and lower generally planar mating or joining surfaces. In at least one of these surfaces are formed a plurality of slot portions 40 which, when the segments are assembled, form whole slots for receiving articles, such as the keys 15. The slot portions 40 open outwardly along at least one of the outside edges or faces of these segments forming the openings 26 of FIG. 3. In the preferred embodiment, three slot portions 40 are formed in offset relation along each of the four sides of the segments 35. This permits the panels 30 to be placed to the immediate left of the rows 26. It is obvious that a greater or fewer number of the panel and slot combinations may be used depending upon the amount of identification and the size of the articles.

As shown in FIGS. 4 and 6, the segments 35 at each of the slot portions 40 form parallel ledges 43 and 44 extending along each side thereof for supporting one of the keys 15. Also, the slot portions 40 are formed with a transverse front ledge 45, as shown in section in FIG. 5. The ledge 45 forms the vertical separations between adjacent openings 26, and in this preferred embodiment has an upper surface lying in a plane in common with the ledges 42 and 43 for supporting the key 15. The front edges of the ledges 45 are beveled at 46 to facilitate the insertion of the key 15 permitting the indentation or pin 22 to ride smoothly over the front of the ledge. The back surfaces 48 of the ledges 45 form a right angle to the upper surface thereby providing key retainer means so that the keys are retained or held in position without sliding out when the rack is rotated on its base.

The segments 35 further include a panel section 50 extending in generally straight lines on one side, shown as the left side, of the front opening 26 of each of the slot portions 40. The panel sections 50 are preferably continuous over the full height of the segment 35, and are provided with inwardly turned tabs 52 on the opposite sides thereof forming grooves for receiving a placard or billboard. Thus, there is one panel portion 50 immediately to the left of each of the slot portions 40 in each segment 35. When the segments 35 are stacked one on top of the other, the portions 50 are in alignment and form the panels 30.

Each rack segment 35 includes an internal, generally rectangular web 55 which interconnects the inner ends of the two centrally located slot portions 40 along each side thereof to make the segments rigid. Each web 55 includes indentations 56 on its upper surface and locating projections 57 on its lower opposite surface which interfit with corresponding indentation and projections on adjacent segments to provide, in part, for the stacking of a plurality of the segments 35 in indexed aligned position. Further means providing for the stacking of a plurality of such segments includes tabs 60 positioned generally in each of the four corners of each segment. The tabs 60 are formed with a tie rod opening 61 through which tie rods 65 may be threaded.

The rack 10 further includes identical top and bottom covers indicated at 70 in FIGS. 8 and 9. The covers 70 are molded with an inwardly turned peripheral rim 72 and a reinforced central support post bearing 75. The covers 70 are further provided with billboard slots 80, there being one slot for each of the billboard panels 30. The slots 80 are offset in the covers so that when the cover 70 is used at the top of the rack 10, the slots 80 are in alignment with their respective panels 30. The cover 70 which is positioned at the bottom of the stacked segments 35 will have the slots reversed, so that a billboard 84 and acetate cover sheet 85 (FIG. 10) when inserted through the slots 80 will not slide through corresponding slots in the bottom cover 70.

The stacked and assembled segments 35 and the top and bottom covers 70 are thus held in assembled relation by the tie rods 65 and nuts 82 and 83 threaded on the exposed extended ends thereof. It is obvious that the capacity of the rack may be either increased or decreased merely by adding or removing one or more of the segments 35.

The assembled segments 35 and covers 70 are mounted for rotation on the base 11 on an upright support post 90 (FIG. 3). The post 90 is mounted in upstanding relation on the base 11 by a nut 92 threaded on the lower end 93 of the post. An acorn retainer nut 94 may be threaded on the top of the post.

The base 11 may be provided with rubber feet 95 to prevent marring of the upper surface of the printer 12 of the scale system, or other surface on which it may be mounted. Also, the rack 10 may be attached to the printer by providing a tapped opening in the lower end of post 90 into which a screw 96 may be threaded to form an extension of post 90 for insertion through a hole in the cover 97 of the printer to receive a retaining nut 98. The base 11 may also be provided with a plurality of rollers 100 spaced circumferentially on the upper surface thereof for engagement with the adjacent outer surface of the bottom plate 70 for supporting the rack segments in freely turning relation on the post 90.

The operation of the invention is largely self-evident from the foregoing description. The appropriate billboards may be lowered through the openings 80 in the top covers 70 into the grooves formed by the tabs 52. Preferably, an acetate cover sheet 85 is also received at the panels 30 to protect the billboards and to provide a convenient surface upon which price information may be written, such as by a wax pencil, so that the price information may be readily changed without having to change or erase the billboard.

The corresponding commodity keys 15 are then inserted into the openings 26 formed in the segments 35 at their parting planes. The pins 22 on the keys 15 drop behind the ledge 45 preventing the keys from flying out when the rack is rotated on the base 11. The individual keys 15 are easily removed merely by first lifting and then withdrawing, while the bevel 46 facilitates the insertion of the keys.

The construction of the rack from identical segments and using identical top and bottom covers provides a low cost merchandising or storing rack in which a relatively large number of items may be stored while providing space sufficient for the identification of such items.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A rack for receiving and storing a plurality of separate objects providing ready access to and individual identification for each of said objects, comprising:
    a plurality of partially hollow unitary rectangular rack segments of substantially identical construction having upper and lower joining surfaces and four outer faces;
    each of said segments having formed in at least one of said surfaces a plurality of partial object-receiving slot portions opening outwardly along each of the four faces of said segments in spaced apart relation which cooperate with partial said slot portions in adjacent segments to define whole article receiving openings in the junction between adjacent surfaces of said segments;
    said segments further including panel sections at each of the four sides between adjacent said slot openings;
    means supporting a plurality of said segments in stacked aligned relation on each other forming the rack having substantially vertical columns of said object-receiving openings separated by vertical panel sections on each of the four faces thereof; and
    means mounting said rack for rotation about a substantially vertical axis for presenting each of the four faces thereof for access for inserting or removing such objects in said openings.

2. A rack for receiving and storing a plurality of separate objects providing ready access to and individual identification for each of said objects, comprising:
    a plurality of partially hollow rack segments of substantially identical construction having upper and lower joining surfaces and forming a plurality of outer faces;

each of said segments having formed in at least one of said surfaces a plurality of object-receiving slot portions opening outwardly along at least one of said outer faces in spaced apart relation defining whole article receiving openings in the joining surfaces between adjacent said segments;

said segments further including panel sections on each of said faces extending in generally straight lines between said front openings of adjacent said slot openings and being offset from the center of each of said segments;

means supporting a plurality of said segments in stacked aligned relation on each other forming a rack having substantially vertical columns of said object-receiving openings separated by vertical columns of panel sections;

a pair of substantially identical covers one positioned at each end of said stacked segments and having an inwardly turned rim engaging a periphery at portions of the adjacent said segments; and means in said covers defining offset billboard slots with the slots in the uppermost said cover aligned with said vertical panel sections and with the corresponding slots in said lower cover being offset with respect to said panel section columns forming a stop for billboard panels received through the slots in said upper cover.

3. A rack for storing a plurality of commodity keys of a weighing scale system and providing for individual selection of each of said keys and for the simultaneous identification and price of each commodity represented by a key adjacent each key position in said rack, comprising:

a plurality of identical molded rectangular rack segments each of substantially uniform thickness throughout and forming upper and lower generally planar joining surfaces and having four outer sides;

each of said rack segments having formed in at least one of said surfaces a plurality of partial key-receiving slots which open outwardly along said faces, there being at least one of said partial slots for each of said faces and which define whole key-receiving openings in said faces when said segments are aligned in stacked relation one on the other with the upper joining surface of each of the adjacent segments in contiguous relation to the lower joining surface of the rack segment immediately thereabove;

each of said segments further having means defining panel sections which extend substantially the height of the rack segment, there being one said panel section for each said key-receiving opening in said segments and positioned on said segment generally alongside of the associated said key opening;

and means supporting a plurality of said segments in said stacked aligned relation forming a commodity key rack having a plurality of columns of said key openings therein separated by columns of said panel sections.

References Cited by the Examiner

UNITED STATES PATENTS

| | | | |
|---|---|---|---|
| 954,793 | 4/1910 | Graham | 211—39 |
| 1,029,576 | 6/1912 | Byham | 312—234.4 |
| 1,572,454 | 2/1926 | Vastola | 312—107 X |
| 1,581,749 | 4/1926 | Mahony | 211—163 X |
| 1,785,666 | 12/1930 | Bachelder | 312—234 X |
| 1,800,963 | 4/1931 | Schiff | 235—150 |
| 2,222,258 | 11/1940 | Haveles | 312—234 X |
| 2,632,267 | 3/1953 | Mitchell | 40—19.5 |
| 3,010,052 | 11/1961 | Heath | 317—101 |

FRANK B. SHERRY, *Primary Examiner.*

CHANCELLOR E. HARRIS, *Examiner.*